(12) United States Patent
Bourassi et al.

(10) Patent No.: US 10,831,187 B2
(45) Date of Patent: Nov. 10, 2020

(54) METHOD FOR SECURING A MANOEUVERE TO BE APPLIED TO A MOTOR VEHICLE

(71) Applicant: VALEO COMFORT AND DRIVING ASSISTANCE, Créteil (FR)

(72) Inventors: Abdelhafid Bourassi, Créteil (FR); José Robineau, Creteil (FR); Laurent Petel, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 208 days.

(21) Appl. No.: 16/071,004

(22) PCT Filed: Jan. 19, 2017

(86) PCT No.: PCT/EP2017/051119
§ 371 (c)(1),
(2) Date: Jul. 18, 2018

(87) PCT Pub. No.: WO2017/125514
PCT Pub. Date: Jul. 27, 2017

(65) Prior Publication Data
US 2019/0018404 A1     Jan. 17, 2019

(30) Foreign Application Priority Data
Jan. 19, 2016   (FR) ..................... 16 50418

(51) Int. Cl.
*G05D 1/00*    (2006.01)
*B62D 15/02*   (2006.01)
(Continued)

(52) U.S. Cl.
CPC .......... *G05D 1/0016* (2013.01); *B60W 30/06* (2013.01); *B60W 50/14* (2013.01);
(Continued)

(58) Field of Classification Search
CPC .......... B60W 2050/146; B60W 30/06; B60W 50/14; B62D 15/0285; G05D 1/0016;
(Continued)

(56) References Cited

U.S. PATENT DOCUMENTS 9,443,430 B2 *   9/2016   Beaurepaire ........... G08G 1/162
9,731,714 B2 *   8/2017   Kiriya ................. G06K 9/00355
(Continued)

FOREIGN PATENT DOCUMENTS

CN     105 100 374 A       11/2015
DE     10 2012 007984 A1    3/2013
(Continued)

OTHER PUBLICATIONS

International Search Report issued in PCT/EP2017/051119 dated Mar. 30, 2017 (3 pages).
(Continued)

*Primary Examiner* — Tyler J Lee
(74) *Attorney, Agent, or Firm* — Osha Bergman Watanabe & Burton LLP

(57) ABSTRACT

The invention relates to a method for securing a manoeuvre of a motor vehicle, according to which an order for activation of first data is sent to a mobile terminal by a control unit of the motor vehicle, the first data is displayed on the screen of said mobile terminal in an area opposite the antenna area so as to induce the implementation of a continuous movement by a user on the screen of said mobile terminal in said opposite area, second data relating to the implementation of said continuous movement by the user is generated by the mobile terminal, said second data is compared with an expected result, and if the comparison is positive, said manoeuvre is executed by the control unit.

18 Claims, 4 Drawing Sheets

(51) Int. Cl.
*B60W 30/06* (2006.01)
*B60W 50/14* (2020.01)
*G06F 3/048* (2013.01)
*H04M 1/02* (2006.01)
*G06F 3/0484* (2013.01)
*G06F 3/0488* (2013.01)

(52) U.S. Cl.
CPC ... *B62D 15/0285* (2013.01); *B60W 2050/146* (2013.01); *G06F 3/0484* (2013.01); *G06F 3/04883* (2013.01); *H04M 1/026* (2013.01); *H04M 1/0281* (2013.01)

(58) Field of Classification Search
CPC .. G06F 3/0484; G06F 3/04883; H04M 1/026; H04M 1/0281
See application file for complete search history.

(56) References Cited

U.S. PATENT DOCUMENTS

| | | | |
|---|---|---|---|
| 2007/0021888 A1* | 1/2007 | Ephraim | B60K 17/30 701/41 |
| 2012/0303181 A1* | 11/2012 | Lee | H04L 9/3215 701/2 |
| 2015/0070196 A1* | 3/2015 | Beaurepaire | G08G 1/162 340/932.2 |
| 2015/0375741 A1* | 12/2015 | Kiriya | G05D 1/0011 701/2 |
| 2016/0046285 A1* | 2/2016 | Kim | G05D 1/0016 340/932.2 |
| 2016/0266778 A1* | 9/2016 | Rawlinson | B60K 35/00 |

FOREIGN PATENT DOCUMENTS

| | | |
|---|---|---|
| DE | 10 2014 011809 A1 | 2/2016 |
| EP | 2 680 101 A2 | 1/2014 |
| EP | 2 690 514 A2 | 1/2014 |
| FR | 3 008 366 A1 | 1/2015 |
| FR | 3 017 096 A1 | 8/2015 |
| TW | 201 308 308 A1 | 2/2013 |

OTHER PUBLICATIONS

Written Opinion of the International Searching Authority issued in PCT/EP2017/051119 dated Mar. 30, 2017 (5 pages).

\* cited by examiner

METHOD FOR SECURING A MANOEUVERE TO BE APPLIED TO A MOTOR VEHICLE

TECHNICAL FIELD OF THE INVENTION

The present invention relates to a method for securing a maneuver to be applied to a motor vehicle.

It is applicable in particular, but in a nonlimiting manner, to maneuvers which make it possible to park a motor vehicle.

TECHNOLOGICAL BACKGROUND OF THE INVENTION

A method for securing a maneuver to be applied to a motor vehicle known to the person skilled in the art comprises the use, by a user of the motor vehicle, of a mobile terminal. This mobile terminal, which is, for example, a cell phone, makes it possible to remotely control the execution of a maneuver on the motor vehicle. Such a maneuver is for example the act of parking the motor vehicle. The user who is situated outside the motor vehicle can park his or her motor vehicle using his or her cell phone. To this end, he or she launches the execution of the maneuver with his or her cell phone and, in order to check that it is indeed still him or her who is in control of the maneuver, on his or her cell phone that he or she holds in one of his or her hands, he or she must perform a continuous movement on the screen of the cell phone, for example he or she must continuously describe a circle over all the screen of the cell phone for the execution of said maneuver to continue to be performed.

It will be noted that the cell phone comprises an antenna which allows communication between said cell phone and an antenna of the motor vehicle to perform this maneuver remotely. Said antenna is for example arranged on the front side of the cell phone, namely that which is directed toward the motor vehicle when the maneuver is performed.

One drawback with this state of the art lies in the fact that the hand of the user holding the cell phone risks disrupting the antenna of said cell phone. Indeed, the hand risks distorting the radiation pattern of the antenna and therefore risks adversely affecting the effectiveness thereof. That can lead to a reduction of the gain and of its radiated power. Thus, that can lead to communication problems between said antenna and that of the motor vehicle, and the maneuver then risks being stopped during execution, independently of the will of the user.

In this context, the present invention aims to resolve the abovementioned drawback.

GENERAL DESCRIPTION OF THE INVENTION

To this end, the invention proposes a method for securing a maneuver to be applied to a motor vehicle, whereby said securing method comprises:
a sending, to said mobile terminal by an electronic control unit of the motor vehicle, of an order to activate first data;
the reception by said mobile terminal of said activation order;
a display of the first data on the screen of said mobile terminal in a zone opposite said antenna zone so as to induce the performance of a continuous movement by a user on the screen of said mobile terminal in said opposite zone;
a generation of second data by the mobile terminal relating to the performance of said continuous movement by said user;
a comparison of said second data with an expected result dependent on the first data;
if the comparison is positive, an execution by the electronic control unit of said maneuver, said steps relating to the first data and to the second data being repeated until the execution of the maneuver is completed.

Thus, as will be seen in detail hereinbelow, the act of inducing the user, who controls the maneuver via his or her cell phone, to perform the continuous movement with a hand in a zone opposite that where the antenna is placed, will oblige him or her to place the hand holding the cell phone in the same said opposite zone. The hand thus interferes much less with the antenna such that the gain of the antenna is not altered. Its radiated power is not reduced toward the vehicle and the antenna-motor vehicle communication is not disrupted. The maneuver is thus secured since it does not risk being interrupted independently of the will of the user.

According to nonlimiting embodiments, the securing method also comprises one or more additional features out of the following.

In a nonlimiting embodiment, the opposite zone is defined such that the continuous movement of the user does not modify the radiation pattern of said antenna.

In a nonlimiting embodiment, the display of the first data determines at least one counter-pressure point for control of the mobile terminal to be assumed by a user in the zone opposite said antenna zone.

In a nonlimiting embodiment, the first data comprise a point-to-point track test.

In a nonlimiting embodiment, the point-to-point track test comprises an angular arrow forming an indication of trace to be performed with a finger.

In a nonlimiting embodiment, the point-to-point track test comprises:
a double rectilinear arrow forming an indication of horizontal trace to be performed with a finger; and
two points positioned on either side of said arrow indicating the limits of the trace.

In a nonlimiting embodiment, the first data also comprise at least one positioning point for one of the thumbs of the user.

In a nonlimiting embodiment, the point-to-point track test comprises a circle with an arrow indicating a direction of displacement.

In a nonlimiting embodiment, the display of the first data on the screen of the mobile terminal releases an intermediate zone for the display of visual information returned by the motor vehicle.

In a nonlimiting embodiment, the second data comprise coordinates of the continuous movement performed by said user.

In a nonlimiting embodiment, the antenna zone is situated on one of the sides of the mobile terminal and the opposite zone is situated on the opposite side.

In a nonlimiting embodiment, it also comprises an illumination of the screen of said mobile terminal as a function of the inclination thereof.

In a nonlimiting embodiment, it also comprises a display of an item of information relating to the inclination of said mobile terminal T.

In a nonlimiting embodiment, it also comprises a preliminary step of sending of a request relating to the maneuver to the electronic control unit of the motor vehicle.

In a nonlimiting embodiment, the maneuver is a maneuver of movement of the motor vehicle between an initial position and a final position.

In a nonlimiting embodiment, the comparison of said second data with said expected result is performed by the mobile terminal.

In a nonlimiting embodiment, the mobile terminal is a cell phone or a smart phone or a portable tablet or a connected object.

Also proposed is a system for securing a maneuver to be applied to a motor vehicle, whereby said securing system comprises an electronic control unit of the motor vehicle and a mobile terminal comprising a screen and an antenna in an antenna zone, said securing system being adapted to:
  send an order to activate first data to said mobile terminal by means of said electronic control unit;
  receive said activation order by means of said mobile terminal;
  display, by means of said mobile terminal, the first data on its screen in a zone opposite said antenna zone so as to induce the performance of a continuous movement by a user on the screen of said mobile terminal in said opposite zone;
  generate, by means of said mobile terminal, second data relating to the performance of said continuous movement by said user;
  compare the second data with an expected result dependent on the first data, said second data being generated relative to the performance of a continuous movement by a user on the screen of the mobile terminal;
  if the comparison is positive, execute said maneuver by means of said electronic control unit.

In a nonlimiting embodiment, the electronic control unit and the mobile terminal are adapted to repeat said steps relating to the first data and to the second data until the execution of the maneuver is completed.

BRIEF DESCRIPTION OF THE FIGURES

The invention and its various applications will be better understood on reading the following description and on studying the accompanying figures.

DESCRIPTION OF EMBODIMENTS OF THE INVENTION

The elements that are identical, by structure or by function, that appear in different figures retain, unless stated otherwise, the same references.

Figure 1:
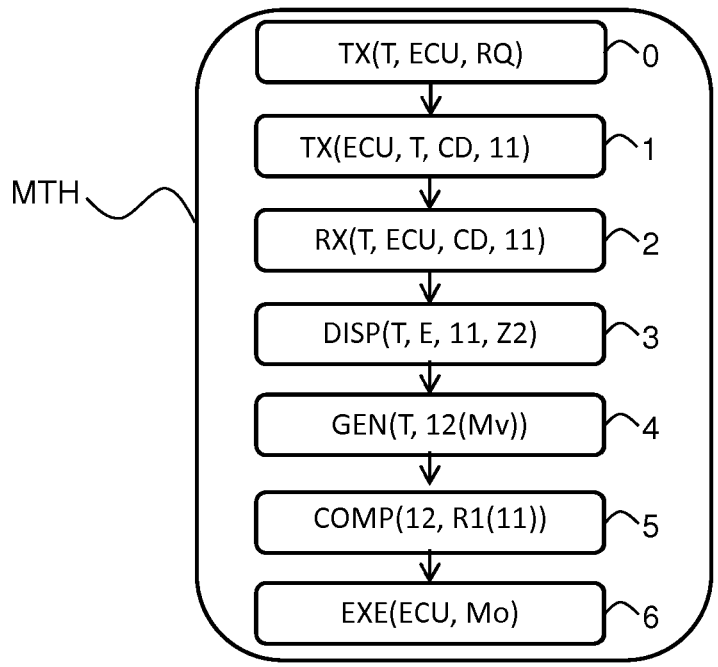
FIG. 1 is a schematic view of a method for securing a maneuver to be applied to a motor vehicle according to a nonlimiting embodiment of the invention.

A method MTH for securing a maneuver Mo to be applied to a motor vehicle V according to the invention is illustrated in FIG. 1.

A motor vehicle should be understood to mean any type of motorized vehicle. The motor vehicle V comprises an electronic control unit ECU and is adapted to communicate with a mobile terminal T.

In a nonlimiting embodiment, the mobile terminal T is a cell phone. In a nonlimiting variant embodiment, the cell phone T is a smartphone.

In another nonlimiting embodiment, the mobile terminal T is a tablet.

The mobile terminal T comprises:
  a screen E; and
  an antenna A situated in an antenna zone Z1. In the nonlimiting example illustrated in FIGS. 2 to 6, the antenna zone Z1 is situated on the front side of the mobile terminal T, namely on the side which is directed toward the motor vehicle V when the maneuver Mo is performed.

In the nonlimiting examples of FIGS. 2 to 6, the mobile terminal is a cell phone or a smartphone.

Using his or her mobile terminal T, a user U will be able to remotely control the starting and the execution of a maneuver Mo, namely when he or she is outside the motor vehicle V.

In a nonlimiting embodiment, the maneuver Mo is a maneuver to move the motor vehicle V between an initial position and a final position.

In a nonlimiting first variant embodiment, the maneuver Mo is a parking maneuver. Thus, for example, this maneuver Mo makes it possible to park the motor vehicle in a given parking place, the initial position being the stopped position of the motor vehicle V just before the start of the execution of the maneuver Mo, and the final position being the position in which the motor vehicle V is when it is parked. This nonlimiting example is taken hereinafter in the description.

It will be noted that the parking maneuver can be, in nonlimiting examples, the act of forward or reverse parking, parking at an angle, face-on or side-on. In a second nonlimiting variant embodiment, the maneuver Mo is a parking exit maneuver, the initial position being the stopped position of the motor vehicle V just before the start of the execution of the maneuver Mo, and the final position being the position in which the motor vehicle V is when it has exited from its parking space.

This parking or parking exit maneuver Mo makes it possible to park or exit a motor vehicle V while being outside said motor vehicle (namely outside of its interior), for example where there is no space for the driver to exit said motor vehicle when the latter is parked such as in a box, for example, or because the adjacent motor vehicles prevent the opening of the doors.

It will be noted that the initial position and the final position are known to the motor vehicle V, such that the latter knows when to stop the execution of the maneuver Mo. The motor vehicle V knows the initial position and the final position by means of position sensor(s) and/or image sensor(s), such as video cameras or ultrasound sensors or any other type of remote sensors. The motor vehicle V will perform the maneuver Mo using these sensors.

The securing method MTH comprises the following steps illustrated in FIG. 1.

It will be noted that, to launch the steps described hereinbelow, in a nonlimiting embodiment, the securing method MTH comprises a preliminary step of sending (referenced 0) of a request RQ by the mobile terminal T relating to the maneuver Mo to the electronic control unit ECU of the motor vehicle V (illustrated in FIG. 1 TX(T, ECU, RQ)). This request RQ is initiated by the user U of the motor vehicle by means of the mobile terminal T. The user U can deliberately request, via the mobile terminal T, via an application of said mobile terminal T, the application of a maneuver Mo to the motor vehicle V.

This request RQ makes it possible:
  to pair the mobile terminal T and the motor vehicle V, namely it makes it possible to initiate the dialog between the motor vehicle V;
  to initiate the maneuver Mo to be applied to the motor vehicle V; and
  to start the engine of the motor vehicle V before the execution of said maneuver Mo if said engine is stopped.

Thus, in the nonlimiting example taken, the user can deliberately launch the maneuver Mo of parking of the motor vehicle V or the maneuver Mo of exiting from a parking space.

The execution of the maneuver Mo and the continuation thereof is done subsequently using the steps presented below which make it possible to check, via the mobile terminal T, that it is indeed still a person controlling the execution of the maneuver Mo.

The method MTH is thus performed as follows.

When the motor vehicle V has detected a position for parking and it is thus ready to be parked or when it is ready to leave its parking place, in the step 1) illustrated TX(ECU, T, CD, 11), the electronic control unit ECU of the motor vehicle V sends an order CD to activate first data 11 to said mobile terminal T.

In a nonlimiting embodiment, the first data 11 comprise a point-to-point track test TP.

In a first nonlimiting variant embodiment, the point-to-point track test TP comprises an angular arrow F1 forming an indication of trace to be performed with a finger.

In a second nonlimiting variant embodiment, the point-to-point track test TP comprises:
  a double rectilinear arrow F2 forming an indication of horizontal trace to be performed with a finger; and
  two points P1, P1' positioned on either side of said arrow F2 indicating the limits of the trace.

In a nonlimiting embodiment of this second variant embodiment, the first data 11 also comprise at least one positioning point P2 for one of the thumbs of a user.

In a third nonlimiting variant embodiment, the point-to-point track test TP comprises a circle C1 with an arrow indicating a direction of movement of the finger.

Obviously, in a nonlimiting embodiment, the point-to-point track test TP can comprise any other geometrical form.

It will be noted that, in a nonlimiting embodiment, the first data 11 are configured in the mobile terminal T during the production or the parameterizing of the mobile terminal T.

In another nonlimiting embodiment, the first data 11 are configured in the electronic control unit ECU of the motor vehicle V and are sent to said mobile terminal T prior to the activation order CD to the mobile terminal T.

It will be noted that the detection of a location for parking is known to the person skilled in the art and is not therefore described here.

It will be noted that the motor vehicle is ready to leave its parking place at any moment.

In the step 2) illustrated RX(T, ECU, CD, 11), the mobile terminal T receives from said electronic control unit ECU said order to activate CD the first data 11.

In the step 3) illustrated DISP(T, E, 11, Z2), following the reception of the activation order CD, the mobile terminal T displays on its screen E the first data 11 in a zone Z2 opposite said antenna zone Z1 so as to induce the performance of a continuous movement Mv by a user U on the screen E of said mobile terminal T in said opposite zone Z2.

In a nonlimiting embodiment, the antenna zone Z1 is situated on one of the sides of the mobile terminal T and the opposite zone Z2 is situated on the opposite side. Thus, in the nonlimiting example illustrated in FIGS. 2 to 6, the antenna zone Z1 is situated on the front side of the mobile terminal T, namely on the side which is directed toward the motor vehicle V and the opposite zone Z2 is situated on the rear side of the mobile terminal T, namely on the side directed towards the user U.

The opposite zone Z2 is defined such that the continuous movement Mv (described later) of the user U to perform the maneuver Mo does not modify the gain g of said antenna A and does not therefore reduce its radiated power.

Figure 2:
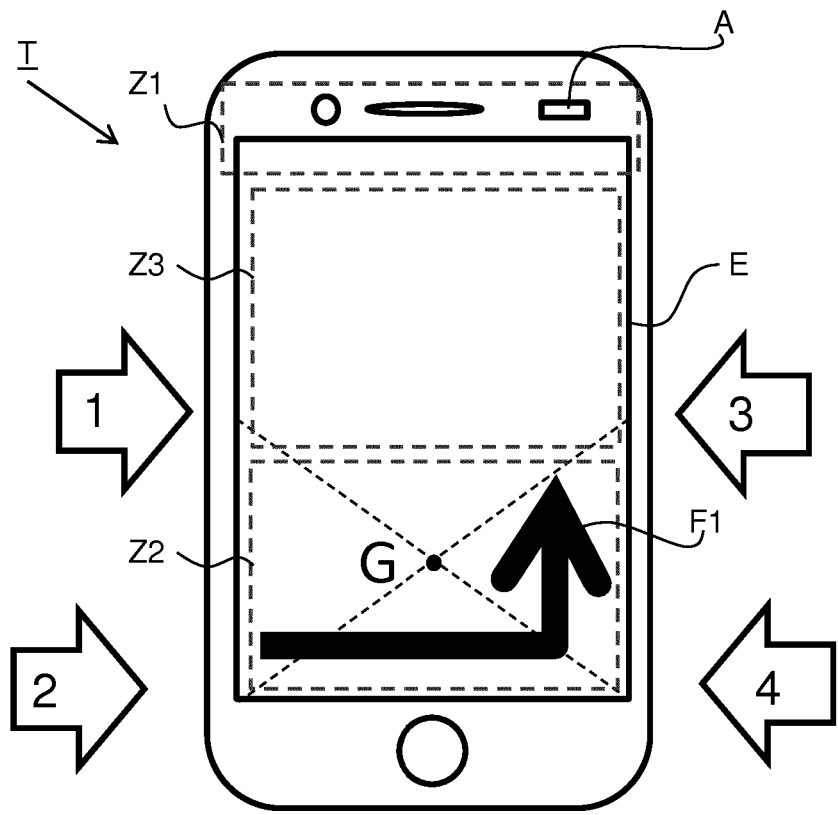
FIG. 2 is a diagram of a cell phone used by the securing method of FIG. 1, said cell phone comprising a screen on which is displayed a point-to-point track test according to a nonlimiting first variant embodiment.

FIG. 2 illustrates the display on the screen E of the first data 11 comprising the point-to-point track test TP according to the first nonlimiting variant embodiment, namely the angular arrow F1 forming an indication of trace to be performed with a finger.

Thus, to execute the maneuver Mo and throughout the maneuver Mo, a finger of the user U must perform a continuous movement Mv following the angular arrow F1 and going forward and backward on said angular arrow F1 until the maneuver Mo is finished, namely until the motor vehicle V has reached the final position, that is to say until it is parked in the nonlimiting example taken.

Figure 3:
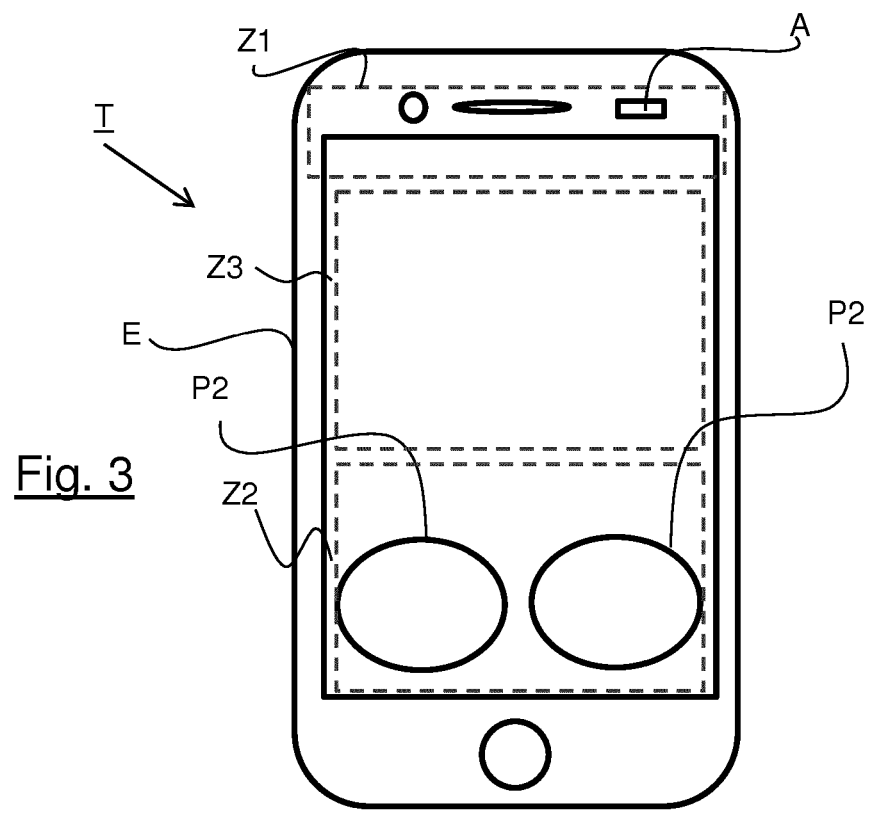
FIG. 3 is a diagram of a cell phone used by the securing method of FIG. 1, said cell phone comprising a screen on which is displayed a positioning point for a thumb according to a nonlimiting embodiment.

FIG. 3 illustrates the display on the screen E of the first data 11 which comprise two possible positioning points P2, namely one for the thumb of the right hand and the other for the thumb of the left hand.

In a nonlimiting embodiment, the mobile terminal T displays on its screen E a message prompting the user U to place one of his or her thumbs on one of the positioning points P2.

In another nonlimiting embodiment, before the display of at least one positioning point P2, the mobile terminal T displays on its screen E a message asking the user U whether he or she is right-handed or left-handed. On receipt of his or her response, the mobile terminal T displays the appropriate positioning point P2.

Figure 4:
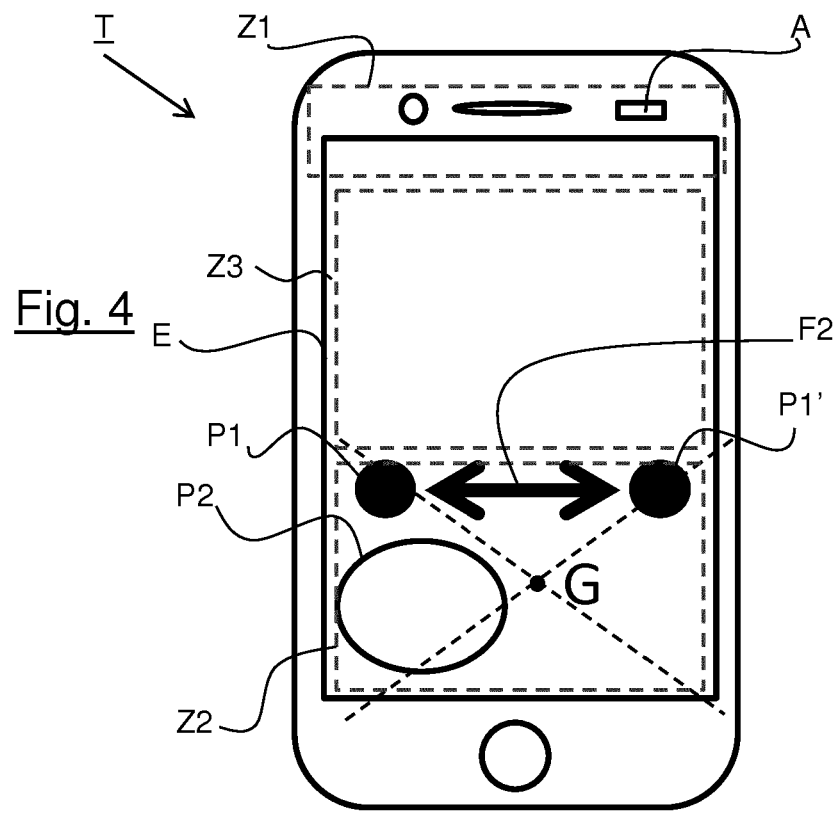
FIG. 4 is a diagram of the cell phone of FIG. 3, the screen of which also displays a point-to-point track test according to a nonlimiting second variant embodiment.
Figure 5:
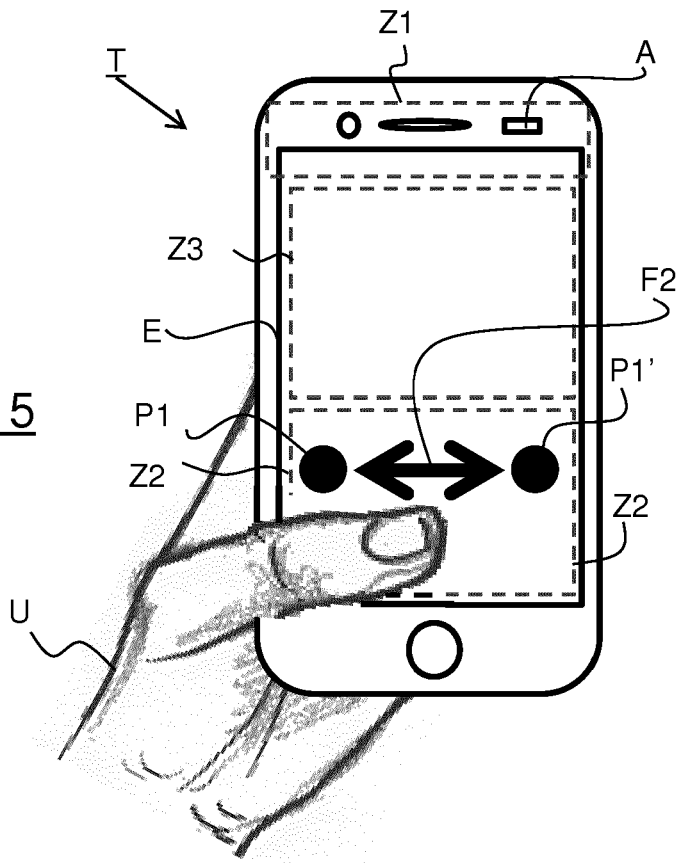
FIG. 5 is a diagram of the cell phone of FIG. 4 on which is also drawn a hand of a user holding said cell phone and whose thumb is positioned on a dedicated positioning point.

FIG. 4 illustrates the mobile terminal T of FIG. 3 on which are also displayed first data 11 comprising the point-to-point track test TP according to the second nonlimiting variant embodiment, namely:
  the rectilinear double arrow F2 forming an indication of horizontal trace to be performed with a finger; and
  the two points P1, P1' positioned on either side of said arrow F2 indicating the limits of the trace.
  FIG. 5 illustrates:
  the display on the screen E of the data of the point-to-point test TP of FIG. 4;
  one of the thumbs of the user U positioned on the positioning point P2, in the nonlimiting example illustrated, namely the thumb of the left hand; and
  the holding of the mobile terminal T by the user U.

Thus, to execute the maneuver Mo and throughout the maneuver Mo, a thumb of one of his or her hands of the user U must be positioned on the positioning point P2 and, at the same time, a finger of the other hand of the user U must perform a continuous rectilinear movement My following the rectilinear arrow F2 and going forward and backward on the rectilinear arrow F2 until the maneuver Mo is finished, namely until the motor vehicle V has reached the final position, that is to say until it is parked in the nonlimiting example taken.

Figure 6:
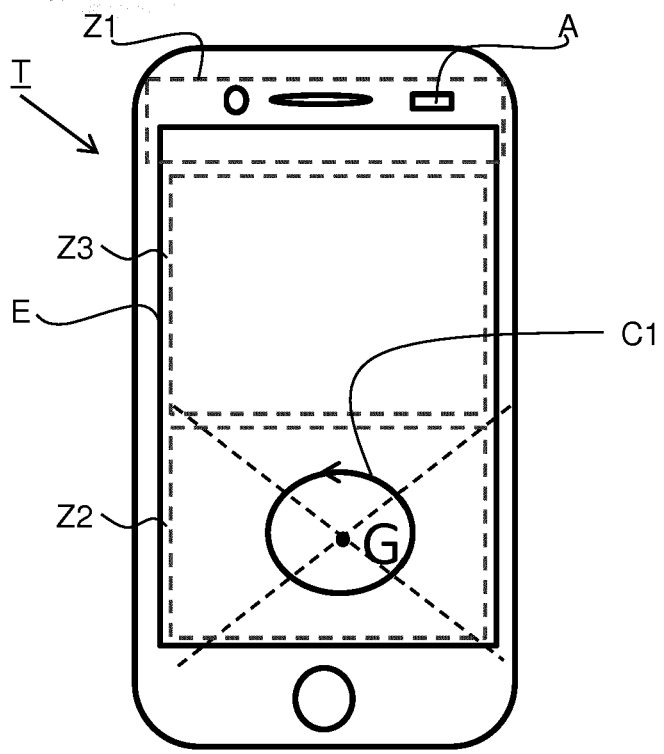
FIG. 6 is a diagram of a cell phone used by the securing method of FIG. 1, said cell phone comprising a screen for displaying a point-to-point track test according to a nonlimiting third variant embodiment.

FIG. 6 illustrates the display on the screen E of the first data 11 comprising the point-to-point track test TP according to the third nonlimiting variant embodiment, namely the circle C1 forming an indication of trace to be performed with a finger.

Thus, to execute the maneuver Mo and throughout the maneuver Mo, a finger of the user U must perform with his or her finger a continuous circular movement Mv to follow the outline of the circle C1 in the direction indicated by the arrow, and do so until the maneuver Mo is finished, namely until the motor vehicle V has reached the final position, that is to say until it is parked in the nonlimiting example taken.

It will be noted that the continuous movement Mv performed by the user U makes it possible to verify that the user U is still present and that it is still him or her controlling the maneuver Mo throughout the execution thereof. Thus, there is an assurance that the motor vehicle is under the control of a human being to execute said maneuver Mo.

As can be seen in FIGS. 2, 4 and 6, the display of the first data 11 determines:
- a point of equilibrium G of the forces between the hand holding the mobile terminal T and the finger used to perform all of the maneuver Mo;
- counter-pressure points referred back to the hand referenced by the arrows 1, 2, 3 and/or 4 for a holding of the mobile terminal T by a user U in the zone Z2 opposite said antenna zone Z1.

Thus, the display of the first data 11 induce the user U to position his or her fingers in a particular zone which is in the opposite zone Z2.

The arrows referenced 1 to 4 in FIG. 2 indicate the holding of the mobile terminal T by the user U and thus four counter-pressure points. In the nonlimiting example of FIG. 2, to perform the trace with a finger of the other hand, the user U is thus obliged to position, on the side of the mobile terminal T, his or her thumb, his or her palm, his or her middle finger (or index finger), his or her ring finger, respectively, as indicated by the four arrows 1, 2, 3 and 4 of FIG. 2 to hold the mobile terminal T.

In the nonlimiting example of FIGS. 4 and 5, to perform the trace with a finger of the other hand, the user U is thus obliged to position, on the screen E of the mobile terminal T, his or her thumb on the screen of the mobile terminal T and his or her index and his or her middle finger on the back of the mobile terminal T to hold the mobile terminal T. The thumb is, here, in opposition with the index finger and the middle finger.

It will be noted that the counter-pressure points are the counter-reaction forces that must be applied with the hand for the mobile terminal T to be stable in the hand of the user U holding said mobile terminal T, counter-forces which oppose the force exerted by said user U with his or her finger to perform all of the maneuver Mo. It will be noted that the counter-pressure points thus defined induce a grasp by the hand of the user U which is different from a natural grasp. In the case of a natural grasp, the point of equilibrium G is situated at the center of the mobile terminal T such that the hand extends over a large part of the mobile terminal T, the counter-pressure points defined by the arrows 1 to 4 in this case being able to be anywhere on the mobile terminal T, which is detrimental for the gain of the antenna A which is then altered. By moving the point of equilibrium G, the disturbances emitted by the hand holding the mobile terminal T on the gain of the antenna A, and consequently on its radiated power, have been reduced.

Moreover, by also inducing a trace by a finger of the user U in the zone Z2 opposite that of the antenna A, the possibility of the hand performing said trace also disturbing the gain of the antenna A during the trace is also avoided. Thus, the trace of a circle over a large part of the screen E of the mobile terminal T has been replaced by the trace of an arrow F1 or of the double arrow F2 or the circle C1 in a particular zone.

The antenna A is thus no longer masked by the hand or the fingers of the user U. There is no degradation of the radiated power of the antenna A. The function of reception/transmission of signals with the motor vehicle V is no longer degraded. The transmission of signals handled by the antenna A is thus performed in the best conditions with a good reception/transmission threshold. This threshold is exceeded. The range of communication with the motor vehicle V is thus not reduced. The second data 12 (described hereinbelow) can be sent from the mobile terminal T to the motor vehicle V without disturbance and the maneuver Mo can thus be performed with complete tranquility. The vehicle does not risk being stopped in an untimely manner during the maneuver Mo.

In a nonlimiting embodiment, the display of the first data 11 on the screen E of the mobile terminal T releases an intermediate zone Z3 for the display of visual information returned by the motor vehicle V.

Such a zone Z3 is illustrated in FIGS. 2 to 6. Thus, if visual information are displayed on the screen E in this intermediate zone Z3, that makes it possible to retain them and to not mask them because of the display of first data 11, which would be the case if a point-to-point track test (for example comprising a circle) displayed over a large part of the screen E were used.

In a first nonlimiting embodiment, the securing method MTH also comprises an illumination of the screen E of said mobile terminal T as a function of its inclination INC, namely as a function of its angle of inclination $\theta$ relative to the Earth reference. To this end, a positioning sensor makes it possible to provide the angle of inclination $\theta$ of the mobile terminal T. In a nonlimiting example, the positioning sensor is a gyroscope incorporated in the mobile terminal T.

In a nonlimiting embodiment, if the inclination INC of the mobile terminal T lies between 30° and 60°, then the screen E is correctly illuminated, namely its brightness is between 100% and 20%, with 100% the maximum level of visibility and 20% the minimum level of visibility with comfort. Below 20%, the visibility will be too poor for the user.

It will be noted that the maximum personal visibility value (corresponding therefore to the 100% brightness) is defined by the user as being his or her own comfort level. This maximum personal visibility value is parameterized by the user in the mobile terminal T.

Thus, the reading of the data displayed on the screen E is prioritized when the mobile terminal T is positioned between 30° and 60°.

In a nonlimiting variant embodiment, if the inclination INC of the mobile terminal T lies between 30° and 60°, then the brightness is 100%.

In another nonlimiting variant embodiment, if the inclination INC of the mobile terminal T is 45°, then the screen is optimally illuminated, namely its brightness is, in a nonlimiting example, equal to 100% and, as soon as the inclination is different from 45°, the brightness is progressively decreased until nothing can be seen any more if the inclination INC is greater than 60° or less than 30°.

In a nonlimiting embodiment, if the inclination INC of the mobile terminal T is greater than 60° (the mobile terminal T tends to be upright) or less than 30° (the mobile terminal T tends to be lying flat), the screen E is less well illuminated, it is darkened, namely its brightness decreases and, in a nonlimiting example, is less than 20%.

The slaving of the brightness to the angle of inclination of the mobile terminal T adds a constraint to the user U who, to be able to read the data displayed on the screen E, must tilt his or her mobile terminal T within the correct range of values, namely, here, between 30° and 60°. That makes it possible to position the mobile terminal T such that its antenna A communicates correctly with the antenna B of the motor vehicle V. Indeed, in this case, the radiated power of the antenna A is satisfactory.

In a second nonlimiting embodiment, the securing method MTH also comprises the display of an information item DAT_INC relating to the inclination INC of said mobile terminal T, namely its angle of inclination θ relative to the Earth reference. That allows the user U to tilt his or her mobile terminal T so as to have a radiated power of the antenna A sufficient for the latter to communicate correctly with the motor vehicle V.

Indeed, if the mobile terminal T is badly inclined, the signals sent by the antenna A lose power.

In a nonlimiting embodiment, if the inclination INC of the mobile terminal T lies between 30° and 60°, the radiated power of the antenna A is sufficient to have a good communication. In a nonlimiting variant embodiment, if the inclination INC is 45°, the communication is optimal.

To this end, in a nonlimiting embodiment, the mobile terminal T comprises an inclination indicator IND. In a nonlimiting example, this inclination indicator IND is a gauge. The inclination information item DAT_INC is therefore a gauge.

This gauge displays a percentage of communication between the antenna A and the motor vehicle V, and in addition:
 changes from green to red when the inclination INC of the mobile terminal T is no longer correct to have a sufficient radiated power;
 changes from red to green when the inclination INC of the mobile terminal T is correct to have a sufficient radiated power.

It will be noted that there is a pre-calibration of the inclination as a function of the radiated power of the antenna A used.

Obviously, the first embodiment with the illumination and the second embodiment with the display of the inclination can be combined.

In the step 4) illustrated GEN(T, 12(Mv)), the mobile terminal T generates second data 12 relating to the performance of said continuous movement Mv by said user U.

In a nonlimiting embodiment, the second data 12 comprise coordinates of the continuous movement Mv performed on the screen E by said user U, namely the coordinates of the trace performed by the human user U.

Thus, the mobile terminal T continuously records the coordinates of the trace performed by the user U. It thus records the movement of the finger of the user U.

In the first nonlimiting variant embodiment of the point-to-point track TP, the recorded coordinates are those of the trace performed by the finger on the angular arrow F1, namely the forward and backward movements along said arrow on the screen E.

In the second nonlimiting variant embodiment of the point-to-point track TP, the recorded coordinates are those of the trace performed by the finger on the rectilinear arrow F2, namely forward and backward movements along said arrow.

In the third nonlimiting variant embodiment of the point-to-point track TP, the recorded coordinates are those of the trace performed by the finger on the circle C1, namely the circular iterations.

In the step 5) illustrated COMP(12, R1(11)), said second data 12 are compared with an expected result R1 dependent on the first data 11.

Thus, the trace actually performed by the user U is compared with a theoretical trace corresponding to the point-to-point test track to be performed, the theoretical trace being the expected result R1 of the point-to-point test track.

The second data 12 are thus validated or invalidated.
The second data 12 can for example be invalidated if:
 in the example of a point-to-point track test, an inexact or too inaccurate trace has been performed by the user U. The user U has not therefore made the right gesture; or
 the transmission of said second data 12 is unsuccessful.

In a nonlimiting embodiment, the comparison is performed by the mobile terminal T.

Thus, the mobile terminal T ensures all of the so-called dead man function, namely it ensures that the finger is always moving and indeed doing the trace to verify that the maneuver is always under the control of the user U.

The mobile terminal T regularly sends the result R2 of the comparison to the electronic control unit ECU (step not illustrated). In a nonlimiting embodiment, the result R2 of the comparison is sent at a frequency of 30 milliseconds in order to ensure a real time control.

The result R2 of the comparison is either a valid state or an invalid state.

In a nonlimiting embodiment, the sending of the result R2 is performed if a hands-free identifier ID of the motor vehicle V is active, namely if it is recognized by said motor vehicle V.

Such a hands-free identifier ID makes it possible to perform a so-called hands-free function, namely automatically open an opening (door, trunk, tailgate) of the motor vehicle V without action on the part of the user.

Such a hands-free identifier ID is recognized by the motor vehicle if it is situated in proximity to said motor vehicle V, namely between 2 and 4 meters. In effect, the identifier ID communicates with said motor vehicle V at low frequency.

Thus, the sending of the result R2 (by the Bluetooth communication protocol for example) is conditional on the activation of the hands-free identifier ID which makes it possible to be sure that the user U is at a distance of 2 to 4 meters, namely at a distance at which he or she does indeed intend to order a maneuver Mo to be applied to the motor vehicle V and the motor vehicle V is indeed within range of his or her sight. There is thus no assurance that the user U is not at 10 meters for example and that he or she "is playing" with the application on his or her mobile terminal T making it possible to launch the maneuver Mo.

It will be noted that the results R2 of the successive comparisons are digital data. They will be modified by a transmission stage to be transmitted via the antenna A to the antenna B of the motor vehicle V. The transmission stage (not illustrated), as known to the person skilled in the art, comprises in particular:

a digital-analog converter for transforming the digital data into low-frequency analog data (of the order of a few hundreds of kilohertz);

a frequency transposition unit for switching from the low frequency to the frequency of the antenna A (namely the Bluetooth® frequency, i.e. 2.4 gigahertz in a nonlimiting example);

a signal amplifier for amplifying the analog data;

the antenna A of the mobile terminal T for:
converting the analog data into electromagnetic signals;
sending the electromagnetic signals to the antenna B of the motor vehicle V, said electromagnetic signals being restored to digital data that can be understood by the electronic control unit ECU of the motor vehicle V via another embodiment stage that is the reverse of the transmission, called reception stage, on the motor vehicle V side.

In another nonlimiting embodiment, the electronic control unit ECU can perform the comparison with the expected result R1 dependent on the first data 11. In this case, the second data 12 are sent by the mobile terminal T to the electronic control unit ECU for the latter to be able to perform the comparison.

In the step 6) illustrated EXE(ECU, Mo), if the comparison is positive, the electronic control unit ECU executes said maneuver Mo, said steps relating to the first data 11 and to the second data 12 being repeated until the execution of the maneuver Mo is completed.

It will be noted that, when the comparison described previously is performed by the mobile terminal T, the steps relating to the first data 11 and to the second data 12 are repeated in the mobile terminal T until the execution of the maneuver Mo is completed.

If the comparison is positive, namely the result R2 of the comparison is a valid sate, the second data 12 are validated, namely the real trace is equal to the theoretical trace, and the maneuver Mo (here the act of parking the motor vehicle V in the nonlimiting example taken) is executed and continued as long as the comparison is positive.

If the comparison is negative, namely the result R2 of the comparison is an invalid state, the second data 12 are invalidated, namely the real trace is different from the theoretical trace, and the maneuver Mo (here the act of parking the motor vehicle V in the nonlimiting example taken) is not executed or is not continued. Thus, even if it has begun, as soon as the comparison becomes negative, then the maneuver Mo is stopped.

When the continuous movement Mv is stopped, the execution of the maneuver is stopped. Thus, if a moving obstacle (a person, another motor vehicle, an animal, etc.) approaches the motor vehicle V, it is sufficient for the user U to stop the trace for the motor vehicle to be stopped.

It will be noted that the steps relating to the first data 11 and to the second data 12, namely the generation of the first data 11, the display thereof, the generation of the second data and the comparison thereof, are repeated until the execution of the maneuver Mo is completed.

Thus, the method MTH described above is executed by a system for securing a maneuver Mo to be applied to the motor vehicle V.

Figure 7:
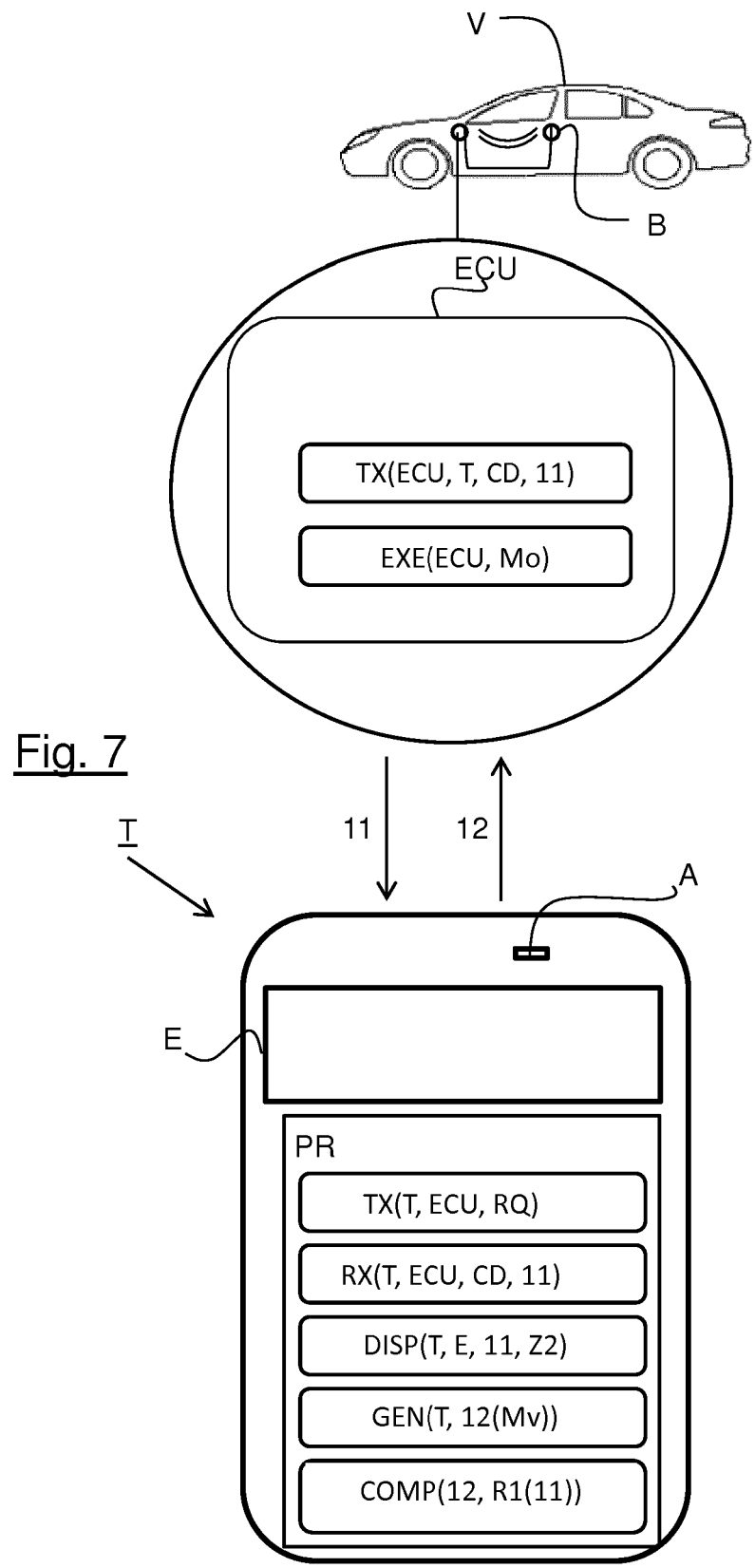
FIG. 7 is a diagram of a securing system suitable for implementing the securing method of FIG. 1 according to a nonlimiting embodiment.

This system is described in FIG. 7. It comprises:
the electronic control unit ECU of the motor vehicle V; and
the mobile terminal T.

The mobile terminal T and the motor vehicle V are adapted to communicate with one another via respective antennas A and B.

The electronic control unit ECU of the motor vehicle V is adapted to:
send an order CD to activate first data 11 to a mobile terminal T comprising a screen E and an antenna A situated in an antenna zone Z1 (function illustrated in FIG. 7 TX(ECU, T, CD, 11));
if the comparison is positive, execute said maneuver Mo (function illustrated in FIG. 7 EXE(ECU, Mo)).

The mobile terminal T comprises a touch screen E and said antenna A in said antenna zone Z1.

In a nonlimiting embodiment, the antenna A communicates with the motor vehicle V, in particular with one of its antennas B via the WIFI™ or Bluetooth® protocol.

It will be noted that, for a parking or parking exit maneuver, the user stands approximately 2 to 4 meters from his or her motor vehicle V.

In a nonlimiting embodiment, the theoretical radiated power of the antenna A is 15 meters.

It will be noted that, because of its environment, the range of the antenna A is not optimal. Indeed, its radiated power is reduced in particular because of the local signal fading phenomena, caused by the reflections of the signals emitted by the antenna A on obstacles in its environment such as walls for example. Because of this, its range can in practice be limited to 7 meters in a nonlimiting example instead of 15 meters for a theoretical range in a nonlimiting example.

When the antenna A of the mobile terminal T communicates with the antenna B of the motor vehicle V, its radiation pattern cooperates with that of the antenna B. Now, since the radiation patterns are not uniform, when the vehicle performs the maneuver Mo, it may turn. The cooperation between the two patterns can thus vary and lead to a variation of the range of the antenna A. The latter may thus become less than 7 meters in the nonlimiting example given.

The fact that the hand of the user no longer disturbs, or disturbs very little, the antenna A, avoids further reducing its range, to 1 to 1.5 meters for example (whereas the user U is between 2 and 4 meters from the motor vehicle). Thus, the range of the antenna A, even when reduced because of its environment and the variation of the cooperation between the two radiation patterns of the two antennas A and B, remains sufficient for the maneuver Mo to be executed safely.

The mobile terminal T is adapted to:
receive from said electronic control unit the order CD to activate the first data 11 (function illustrated in FIG. 7 RX(T, ECU, CD, 11));
display the first data 11 on its screen E in a zone Z2 opposite said antenna zone Z1 so as to induce the performance of a continuous movement Mv by a user U on the screen E of said mobile terminal T in said opposite zone Z2 (function illustrated in FIG. 7 DISP (T, E, 11, Z2));
generate said second data 12 relating to the performance of said continuous movement Mv by said user U (function illustrated in FIG. 7 GEN(T, 12(Mv))).

In the nonlimiting embodiment illustrated, the mobile terminal T is also adapted to compare second data 12 with an expected result R1 dependent on the first data 11, said second data being generated in relation to the performance of a continuous movement Mv by said user U on the screen E of the mobile terminal T (function illustrated in FIG. 7 COMP(12, R1(11)).

In a nonlimiting embodiment, the mobile terminal T is also adapted to send a request RQ concerning the maneuver Mo to the electronic control unit ECU of the motor vehicle V (function illustrated in FIG. 7 TX(T, ECU, RQ)).

The mobile terminal T comprises a processing unit PR for performing the abovementioned functions. The processing unit PR comprises one or more processors.

In a nonlimiting embodiment, the electronic control unit ECU and the mobile terminal T (in particular its processing unit PR) are adapted to repeat said steps relating to the first data 11 and to the second data 12 until the execution of the maneuver Mo is completed.

Obviously, the description of the invention is not limited to the embodiments described above.

Thus, the method can be applicable to any motorized vehicle in which a maneuver Mo would be controlled via a unit external to said motorized vehicle, such as, in nonlimiting examples, remotely-controllable craft such as small models or drones.

Thus, instead of performing the point-to-point track test TP with one of his or her fingers, the user U can use a stylus.

Thus, the display of first data 11 in the opposite zone Z2 other than an arrow or a double arrow or a circle can be performed.

Thus, the invention described presents in particular the following advantages:
- it does not alter the radiation pattern of the antenna, in other words it does not alter the gain of the antenna in all the directions. The antenna is thus not disturbed in the transmission/reception of signals;
- it avoids having the motor vehicle V stop in an untimely manner in the middle of the maneuver Mo independently of the will of the user controlling the maneuver Mo and does so without modifying the antenna A to increase its performance levels for example;
- it makes it possible to remain above the threshold of reception/transmission of signals by the antenna A;
- it makes it possible to apply a maneuver Mo to the motor vehicle V safely, without modifying the performance levels of the antenna A and without changing the antenna A. It is therefore inexpensive to implement;
- it is simple to implement;
- it makes it possible, without modifying its operation or its performance levels, to use a mobile terminal T to control the launching and the execution of a maneuver and perform the "dead man" function.

The invention claimed is:

1. A method for securing a maneuver to be applied to a motor vehicle, comprising:
   sending, to a mobile terminal by an electronic control unit of the motor vehicle, an order to activate displaying first data on a screen of the mobile terminal;
   receiving, by said mobile terminal said activation order;
   displaying the first data on the screen of said mobile terminal in a zone opposite an antenna zone so as to induce a performance of a continuous movement by a user on the screen of said mobile terminal in said opposite zone;
   generating second data by the mobile terminal relating to the performance of said continuous movement by said user;
   comparing said second data with an expected result dependent on the first data; and
   when the comparison is positive, executing, by the electronic control unit said maneuver, said steps relating to the first data and to the second data being repeated until the execution of the maneuver is completed.

2. The securing method as claimed in claim 1, wherein the opposite zone is defined such that the continuous movement of the user does not modify the radiation pattern of said antenna.

3. The securing method as claimed in claim 1, wherein the displaying of the first data determines at least one counter-pressure point for control of the mobile terminal to be assumed by a user in the zone opposite said antenna zone.

4. The securing method as claimed in claim 1, wherein the first data comprise a point-to-point track test.

5. The securing method as claimed in claim 4, wherein the point-to-point track test comprises an angular arrow forming an indication of trace to be performed with a finger.

6. The securing method as claimed in claim 4, wherein the point-to-point track test comprises:
   a double rectilinear arrow forming an indication of horizontal trace to be performed with a finger; and
   two points positioned on either side of said arrow indicating the limits of the trace.

7. The securing method as claimed in claim 6, wherein the first data also comprise at least one positioning point for one of the thumbs of the user.

8. The securing method as claimed in claim 4, wherein the point-to-point track test comprises a circle with an arrow indicating a direction of displacement.

9. The securing method as claimed in claim 1, wherein the displaying of the first data on the screen of the mobile terminal releases an intermediate zone for the display of visual information returned by the motor vehicle.

10. The securing method as claimed in claim 1, wherein the second data comprise coordinates of the continuous movement performed by said user.

11. The securing method as claimed in claim 1, wherein the antenna zone is situated on one of the sides of the mobile terminal and the opposite zone is situated on the opposite side.

12. The securing method as claimed in claim 1, further comprising illuminating the screen of said mobile terminal as a function of the inclination thereof.

13. The securing method as claimed in claim 1, further comprising displaying an item of information relating to the inclination of said mobile terminal.

14. The securing method as claimed in claim 1, further comprising a preliminary step of sending of a request relating to the maneuver to the electronic control unit of the motor vehicle.

15. The securing method as claimed in claim 1, wherein the maneuver is a maneuver of movement of the motor vehicle between an initial position and a final position.

16. The securing method as claimed in claim 1, wherein the comparison of said second data with said expected result is performed by the mobile terminal.

17. A system for securing a maneuver to be applied to a motor vehicle, said securing system comprising:
   an electronic control unit of the motor vehicle; and
   a mobile terminal comprising a screen and an antenna in an antenna zone, said securing system being configured to:
      send an order to activate displaying first data on the screen of said mobile terminal by said electronic control unit;
      receive said activation order by said mobile terminal;
      display, by said mobile terminal, the first data on the screen in a zone opposite said antenna zone so as to induce a performance of a continuous movement by a user on the screen of said mobile terminal in said opposite zone;

generate, by said mobile terminal, second data relating to the performance of said continuous movement by said user;

compare the second data with an expected result dependent on the first data, said second data being generated relative to the performance of a continuous movement by a user on the screen of the mobile terminal; and when the comparison is positive, execute said maneuver by said electronic control unit.

18. The system for securing a maneuver to be applied to a motor vehicle as claimed in claim 17, wherein the electronic control unit and the mobile terminal are adapted to repeat said steps relating to the first data and to the second data until the execution of the maneuver is completed.

* * * * *